United States Patent [19]

Andrus et al.

[11] 4,084,972
[45] Apr. 18, 1978

[54] GLASS-CERAMICS WITH METALLIC IRON SURFACES

[75] Inventors: Ronald L. Andrus, Elmira; Richard F. Reade, Corning, both of N.Y.

[73] Assignee: Corning Glass Works, Corning, N.Y.

[21] Appl. No.: 757,585

[22] Filed: Jan. 7, 1977

[51] Int. Cl.$^2$ .................. C03C 3/22; C03B 32/00
[52] U.S. Cl. ....................... 106/39.7; 65/32; 65/33
[58] Field of Search ............. 65/32, 33; 106/39.7, 106/39.8

[56] References Cited

U.S. PATENT DOCUMENTS

| | | | |
|---|---|---|---|
| 3,464,806 | 9/1969 | Seki et al. | 65/32 |
| 3,557,576 | 11/1971 | Baum | 65/32 X |
| 3,639,113 | 2/1972 | Aslanova et al. | 65/32 |
| 3,790,360 | 2/1974 | Kato et al. | 65/32 |
| 3,892,904 | 7/1975 | Taiyaka | 65/32 X |
| 3,902,881 | 9/1975 | Pirooz | 65/32 |
| 3,962,514 | 6/1976 | Rittler | 106/39.7 |

*Primary Examiner*—Richard V. Fisher
*Assistant Examiner*—Frank W. Miga

*Attorney, Agent, or Firm*—Clinton S. Janes, Jr.; Clarence R. Patty, Jr.

[57] ABSTRACT

The present invention is concerned with the production of glass-ceramic articles, wherein the predominant crystal phase consists of beta-spodumene solid solution or nepheline, but which have integral surface films containing alpha-iron. The method for producing such articles comprises two general steps. First, a glass article having a composition within a particularly-defined area within the $Li_2O$-$FeO$-$Al_2O_3$-$SiO_2$-$TiO_2$ field or within the $Na_2O$-$FeO$-$Al_2O_3$-$SiO_2$-$TiO_2$ field is heat treated under oxidizing conditions at temperatures of at least about 1000° C. to cause crystallization in situ of the glass to a glass-ceramic article wherein beta-spodumene solid solution or nepheline crystals constitute the predominant crystal phase in the interior of the article and, at the same time, an integral surface layer containing hematite crystals is developed. Thereafter, second, the glass-ceramic article is exposed to an essentially dry reducing atmosphere at a temperature between about 500°–800° C. to effect the conversion of the hematite crystals to alpha-iron. The resulting surface layers can be highly electrically conductive and may demonstrate magnetic properties suitable for the recording, storage, and erasing of information.

6 Claims, 1 Drawing Figure

GLASS-CERAMICS WITH METALLIC IRON SURFACES

BACKGROUND OF THE INVENTION

U.S. Pat. No. 3,926,602 describes a process for preparing glass-ceramic articles possessing highly-durable, integral surface layers demonstrating distinctly metallic lusters. When those surface layers were developed in situ upon previously polished glass surfaces, mirror-like finishes with good color and spatial reproduction of reflected images could be produced.

The articles were prepared from glasses consisting essentially, expressed in weight percent on the oxide basis, of about 0.5–3.5% FeO, 3–6% $Li_2O$, 16–21% $Al_2O_3$, 65–75% $SiO_2$, and 1.5–7% $RO_2$, wherein $RO_2$ consisted of 1.5–6% $TiO_2$ and 0–3% $ZrO_2$. Two different types of crystallization were obtainable where two different heat treatment schedules were employed.

Thus, in the first schedule, the glass articles were subjected to temperatures between about 850°–1025° C. to cause the growth of beta-quartz solid solution crystals in the interior portion of the article and, at the same time, a very thin integral surface layer containing alpha-hematite crystals was formed. The articles displayed a varying degree of transparency, depending upon the amount of iron included in the base composition.

In the second schedule, the glass article was heated to at least about 1050° C. which caused conversion of the beta-quartz solid solution crystals to beta-spodumene solid solution with the article becoming opaque as a consequence. However, the thin surface layer of alpha-hematite crystals remained intact.

U.S. application Ser. No. 757,582, filed concurrently herewith by the present applicants, discloses the manufacture of glass-ceramic articles wherein beta-quartz solid solution and/or beta-spodumene solid solution crystals constitute the predominant or sole crystal phase in the interior portion of the articles, but wherein a thin integral surface layer containing magnetite crystals is developed in situ. The method of the invention involves two basic steps.

First, a glass article consisting essentially, expressed in weight percent on the oxide basis, of about 1–6% FeO, 3–10% $Li_2O$, 15–40% $Al_2O_3$, 40–75% $SiO_2$, and 2–7% $RO_2$, wherein $RO_2$ consists of 2–6% $TiO_2$ and 0–3% $ZrO_2$, is subjected in an oxidizing environment to a temperature between about 750°–1025° C. to cause the growth in situ of beta-quartz solid solution crystals in the interior portion of the article and, simultaneously, a thin integral surface layer containing alpha-hematite crystals is developed in situ. Where a crystallization temperature in excess of about 1050° C. is employed, the beta-quartz solid solution crystals will be converted to beta-spodumene solid solution crystals. The thin integral surface layer containing alpha-hematite crystals will not be disturbed.

Subsequently, the crystallized article is exposed to a $H_2O$-containing reducing atmosphere at a temperature between about 450°–650° C. to cause the reduction of the alpha-hematite crystals in the surface layer to magnetite. In the preferred practice, the crystallized article is initially contacted with a hot mineral acid and then exposed to the reducing environment. Wet forming gas provided the most desirable reducing atmosphere.

U.S. application Ser. No. 757,584, filed concurrently herewith by the present applicants, discloses the manufacture of glass articles having very thin, integral surface layers containing hematite crystals (alpha-$Fe_2O_3$), or magnetite crystals ($Fe_3O_4$), or metallic iron crystals dispersed within a glassy matrix. The crystal content of the surface layers is very high, i.e., greater than about 50% by volume, such that the crystals provide an essentially continuous film.

The method of that invention for achieving a glass having an integral surface layer containing hematite crystals comprehends two basic steps:

(1) a batch for a glass consisting essentially, in weight percent on the oxide basis, of 1–15% $R_2O$, wherein $R_2O$ consists of 0–10% $Li_2O$ and 0–15% $Na_2O$ and/or $K_2O$, 0.3–13% FeO, 15–35% $Al_2O_3$, 55–80% $SiO_2$, and 0–5% $TiO_2$ and/or $ZrO_2$, is melted and formed into a glass article of a desired configuration; and (2) the glass article is heat treated at a temperature of at least 675° C., but less than 950° C., under oxidizing conditions to cause the crystallization in situ of hematite crystals in the surface of the glass.

When the glass article having the integral surface layer containing hematite crystals is exposed to a $H_2O$-containing reducing atmosphere at a temperature between about 450°–650° C., the hematite crystals are reduced to magnetite.

When the glass article having the integral surface layer containing hematite crystals (or magnetite crystals) is exposed to an essentially dry reducing atmosphere at a temperature between about 450°–650° C., the hematite crystals (and magnetite crystals) are reduced to metallic iron.

OBJECTIVE OF THE INVENTION

It has been recognized that the formation of a glass or ceramic substrate material having an integral surface layer of metallic iron could have wide utility in applications where the electrical conductivity thereof is desired. Therefore, the primary objective of the instant invention is to provide a glass-ceramic article having an integral surface layer of metallic iron.

SUMMARY OF THE INVENTION

That objective can be attained in glass-ceramic articles containing beta-spodumene solid solution or nepheline as the predominant crystal phase prepared from compositions in the $Li_2O$—FeO—$Al_2O_3$—$SiO_2$—$RO_2$ system consisting essentially, by weight on the oxide basis, of about 3–6% $Li_2O$, 1–5% FeO, 15–25% $Al_2O_3$, 50–75% $SiO_2$, and 2–7% $RO_2$, wherein $RO_2$ consists of 2–6% $TiO_2$ and 0–3% $ZrO_2$, and from compositions in the $Na_2O$—FeO—$Al_2O_3$—$SiO_2$—$RO_2$ quinary approximating the stoichiometry of nepheline consisting essentially, by weight on the oxide basis, of about 10–20% $Na_2O$, 1–5% FeO, 30–37% $Al_2O_3$, 36–42% $SiO_2$, and 2–7% $RO_2$, wherein $RO_2$ consists of 2–6% $TiO_2$ and 0–3% $ZrO_2$. Up to 10% $K_2O$ may be included in the latter compositions which may enter into and form a $K_2O$-containing nepheline solid solution. The beta-spodumene solid solutions have compositions within the system $Li_2O \cdot Al_2O_3 \cdot nSiO_2$, where $n$ varies between about 3.5–8, and the nephelines have compositions within the system $Na_2O \cdot Al_2O_3 \cdot 2SiO_2$.

The inventive method comprehends four fundamental steps:

First, a glass composition of the proper proportions is melted;

Second, the melt is simultaneously cooled to a temperature at least within, and preferably below, the transformation range thereof and a glass article of a desired configuration shaped therefrom;

Third, the glass article is exposed in an oxidizing atmosphere to a temperature of at least about 1000°, but not in excess of about 1300° C., for a sufficient period of time to convert the glass article into a glass-ceramic article by effecting the growth in situ of beta-spodumene solid solution or nepheline crystals in the interior portion of the article and alpha-hematite ($Fe_2O_3$) crystals in an integral thin surface layer; and Fourth, the glass-ceramic article is exposed to an essentially dry reducing atmosphere at a temperature between about 500°–800° C. for a sufficient period of time to reduce the hematite in the integral surface layer to alpha-iron. The article is cooled to room temperature in the reducing atmosphere.

The inventive alpha-iron films are continuous over the surface of the glass-ceramic articles and provide electrical conduction over a wide range of values depending upon precursor glass compositions, heat treatment, and surface conditions. This circumstance renders the metallic iron surfaces suitable for such applications as resistors, printed circuit boards, and other utility where the unique combination of magnetic and electrical properties can be advantageously employed.

DESCRIPTION OF PREFERRED EMBODIMENTS

Table I recites a number of glass compositions, expressed in parts by weight on the oxide basis, illustrating the operating parameters of the present invention. Inasmuch as the sums of the individual ingredients total or closely approximate 100, the compositions can, for practical purposes, be considered to be reported in terms of weight percent. The actual batch ingredients may comprise any materials, either the oxide or other compounds, which, when melted together, will be converted into the desired oxide in the proper proportion.

The batch ingredients were compounded, mixed together in a ball mill to insure homogeneity, and then deposited into platinum crucibles. (It will be understood that the following melts were merely laboratory runs and that larger scale melting for commercial production would obviously employ larger batches and utilize pot or tank melting facilities.) After placing a cover therein, the crucibles were positioned in furnaces operating at about 1550°–1650° C. and the batches melted for about 16 hours. Glass cane about 0.25 inch in diameter was hand drawn from the melt and the remainder poured onto cold steel plates to yield a glass slab about 0.5 inch in thickness. The cane samples were allowed to cool in the ambient atmosphere, but the slabs were immediately transferred to annealers operating at 400°–650° C.

The glass slabs were cooled to room temperature to permit an examination for glass quality and were annealed to enable their being sawed into test samples. This cooling to room temperature is not a requirement for operability of the present invention, but the glass articles must be cooled to a temperature at least within, and preferably below, the transformation range before being heat treated in situ in order to assure fine-grained crystallization in situ.

$As_2O_3$ was included in the glass compositions to perform its conventional function as a fining agent.

TABLE I

| | 1 | 2 | 3 | 4 | 5 | 6 | 7 |
|---|---|---|---|---|---|---|---|
| $SiO_2$ | 70.0 | 69.4 | 70.2 | 69.7 | 68.0 | 68.8 | 69.5 |
| $Al_2O_3$ | 18.1 | 18.0 | 18.2 | 18.0 | 20.3 | 20.5 | 20.3 |
| $Li_2O$ | 4.3 | 4.3 | 4.0 | 4.0 | 4.5 | 3.4 | 4.6 |
| FeO | 1.8 | 1.8 | 2.7 | 2.6 | 2.7 | 3.4 | 3.1 |
| $TiO_2$ | 5.3 | 6.2 | 4.5 | 5.3 | 4.0 | 4.1 | 2.1 |
| $As_2O_3$ | 0.4 | 0.4 | 0.4 | 0.4 | 0.5 | 0.5 | 0.5 |

TABLE I-continued

| | 8 | 9 | 10 | 11 | 12 | 13 | 14 |
|---|---|---|---|---|---|---|---|
| $SiO_2$ | 57.0 | 56.3 | 53.0 | 60.4 | 60.1 | 59.7 | 63.0 |
| $Al_2O_3$ | 21.6 | 21.3 | 22.7 | 22.3 | 22.2 | 22.2 | 20.2 |
| $Li_2O$ | 3.6 | 3.6 | 3.2 | 3.9 | 3.9 | 5.4 | 5.0 |
| FeO | 3.2 | 4.4 | 2.3 | 2.7 | 2.7 | 2.0 | 1.8 |
| $TiO_2$ | 5.4 | 5.3 | 5.5 | 3.6 | 2.9 | 4.4 | 4.1 |
| $P_2O_5$ | 7.8 | 7.7 | 11.9 | 6.4 | 6.4 | 3.9 | 3.6 |
| $ZrO_2$ | 0.9 | 0.9 | 0.9 | — | 1.1 | — | — |
| $As_2O_3$ | 0.5 | 0.5 | 0.5 | 0.4 | 0.4 | 0.5 | 0.5 |
| $Na_2O$ | — | — | — | 0.3 | 0.3 | — | — |
| $B_2O_3$ | — | — | — | — | — | 1.9 | 1.8 |

| | 15 | 16 | 17 | 18 | 19 | 20 | 21 |
|---|---|---|---|---|---|---|---|
| $SiO_2$ | 58.2 | 65.4 | 67.2 | 66.5 | 68.9 | 59.3 | 74.0 |
| $Al_2O_3$ | 21.3 | 21.5 | 19.8 | 19.6 | 20.1 | 26.5 | 16.2 |
| $Li_2O$ | 3.6 | 3.7 | 4.8 | 4.0 | 5.0 | 5.4 | 3.7 |
| FeO | 1.9 | 2.0 | 1.8 | 3.5 | 1.8 | 2.4 | 2.2 |
| $TiO_2$ | 3.2 | 3.3 | 6.0 | 5.9 | 1.8 | 2.1 | 3.3 |
| $P_2O_5$ | 7.6 | — | — | — | — | — | — |
| $ZrO_2$ | — | — | — | — | 1.9 | 1.6 | — |
| $As_2O_3$ | 0.4 | 0.4 | 0.5 | 0.5 | 0.5 | — | 0.6 |
| $B_2O_3$ | 3.8 | 3.8 | — | — | — | — | — |
| MgO | — | — | — | — | — | 0.7 | — |
| ZnO | — | — | — | — | — | 1.3 | — |

| | 22 | 23 |
|---|---|---|
| $SiO_2$ | 40.2 | 40.3 |
| $Al_2O_3$ | 35.2 | 35.4 |
| FeO | 3.2 | 1.6 |
| $TiO_2$ | 2.4 | 2.4 |
| $As_2O_3$ | 0.4 | 0.4 |
| MgO | 0.6 | 0.6 |
| $Na_2O$ | 17.8 | 16.7 |
| CaO | — | 2.5 |

In general, the most ideal combination of mechanical, thermal, and electrical properties is attained in the beta-spodumene solid solution-containing articles where the precursor glass consists essentially solely of $Li_2O$, FeO, $Al_2O_3$, $SiO_2$, and $TiO_2$ plus, optionally, $ZrO_2$. Thus, additions of $Na_2O$ and/or $K_2O$ frequently act to raise the coefficient of thermal expansion and decrease the chemical durability of the articles, as well as demonstrating their well-known adverse effect upon electrical properties. Hence, their essential absence is greatly preferred. Minor amounts of divalent metal oxides, e.g., the alkaline earth metals, ZnO, and PbO, can be tolerated, but their presence does not appear to impart any beneficial properties to the final product. Such can, however, be useful as melting and forming aids. In general, the total of those additions ought not to exceed about 10%. The addition of such network formers $B_2O_3$ and $P_2O_5$ can improve glass quality and stability, but result in a greater proportion of residual glass in the final glass-ceramic article. Overall, the sum of extraneous components should not exceed about 15% by weight.

In like manner, the preferred combination of physical properties is achieved in the nepheline-containing articles, illustrated by Examples 22 and 23, where the parent glass composition is composed solely of the $Na_2O$-FeO-$Al_2O_3$-$SiO_2$-$RO_2$ quinary with, optionally, $K_2O$ which can substitute in part for $Na_2O$ in the nepheline structure. The inclusion of $Li_2O$ generally leads to the development of crystal phases other than nepheline. Also, again, minor amounts of divalent metal oxides and such network formers as $B_2O_3$ and $P_2O_5$ may be useful to assist in the glassmaking process and/or in improving glass quality and stability. The total of all such extraneous additions, other than $K_2O$, ought not to exceed about 10%.

Table II reports several heat treatment schedules which were applied to the glass articles prepared from the compositions recited in Table I to cause crystallization thereof in situ. In the schedules recorded in Table II, an electrically-fired furnace utilizing an atmosphere of air was employed and the crystallized articles were cooled to room temperatures at furnace rate, i.e., the electrical power to the furnace was cut off and the furnace allowed to cool with the articles retained therein. The cooling rate resulting thereby was estimated to range between about 3°–5° C./minute. More rapid rates of cooling are feasible but this practice of "cooling at furnace rate" is especially convenient in the laboratory.

TABLE II

| Schedule A: | Heat at 300° C./hour to 750° C. |
| --- | --- |
| | Hold thereat for 4 hours |
| | Heat at 200° C./hour to 1150° C. |
| | Heat at 50° C./hour to 1250° C. |
| | Hold thereat for 4 hours |
| Schedule B: | Heat at 300° C./hour to 750° C. |
| | Heat at 25° C./hour to 850° C. |
| | Heat at 200° C./hour to 1250° C. |
| | Hold thereat for 4 hours |
| Schedule C: | Heat at 300° C./hour to 800° C. |
| | Hold thereat for 4 hours |
| | Heat at 175° C./hour to 1150° C. |
| | Heat at 50° C./hour to 1225° C. |
| | Hold thereat for 4 hours |
| Schedule D: | Heat at 300° C./hour to 800° C. |
| | Hold thereat for 4 hours |
| | Heat at 200° C./hour to 1250° C. |
| | Hold thereat for 4 hours |
| Schedule E: | Heat at 300° C./hour to 800° C. |
| | Hold thereat for 4 hours |
| | Heat at 200° C./hour to 1200° C. |
| | Hold thereat for 4 hours |
| Schedule F: | Heat at 300° C./hour to 800° C. |
| | Hold thereat for 4 hours |
| | Heat at 200° C./hour to 1100° C. |
| | Hold thereat for 4 hours |
| Schedule G: | Heat at 300° C./hour to 800° C. |
| | Heat at 40° C./hour to 1000° C. |
| | Heat at 175° C./hour to 1150° C. |
| | Hold thereat for 7 hours |
| Schedule H: | Heat at 300° C./hour to 700° C. |
| | Heat at 40° C./hour to 1000° C. |
| | Heat at 150° C./hour to 1125° C. |
| | Hold thereat for 16 hours |
| Schedule I: | Heat at 300° C./hour to 700° C. |
| | Heat at 10° C./hour to 760° C. |
| | Heat at 200° C./hour to 1100° C. |
| | Hold thereat for 4 hours |
| Schedule J: | Heat at 300° C./hour to 700° C. |
| | Heat at 20° C./hour to 800° C. |
| | Heat at 125° C./hour to 1050° C. |
| | Hold thereat for 4 hours |
| Schedule K: | Heat at 300° C./hour to 750° C. |
| | Heat at 25° C./hour to 850° C. |
| | Heat at 200° C./hour to 1225° C. |
| | Hold thereat for 24 hours |
| Schedule L: | Heat at 300° C./hour to 950° C. |
| | Hold thereat for 2 hours |
| | Heat at 150° C./hour to 1250° C. |
| | Hold thereat for 4 hours |
| Schedule M: | Heat at 300° C./hour to 750° C. |
| | Heat at 25° C./hour to 850° C. |
| | Heat at 100° C./hour to 1250° C. |
| | Hold thereat for 8 hours |
| Schedule N: | Heat at 300° C./hour to 750° C. |
| | Heat at 20° C./hour to 850° C. |
| | Heat at 100° C./hour to 1250° C. |
| | Hold thereat for 12 hours |
| Schedule O: | Heat at 300° C./hour to 800° C. |
| | Hold thereat for 6 hours |
| | Heat at 50° C./hour to 1000° C. |
| | Heat at 200° C./hour to 1250° C. |
| | Hold thereat for 24 hours |

Table III reports visual descriptions of the crystallized body. The articles produced were highly crystalline, with beta-spodumene solid solution or nepheline constituting essentially the sole crystal phase in the interior portion thereof and a thin surface layer (no more than several thousand angstroms thick) containing alpha-hematite crystals, these phases being identified through X-ray diffraction analyses. Examination of the articles via X-ray diffraction and electron microscopy indicated bulk crystallization well in excess of 50% by volume.

As can be observed from Table III, the glass-ceramic bodies customarily exhibit a non-metallic appearing surface which can vary widely in color. Thus, the crystallized articles commonly display a dull or earthen surface ranging in coloration from orange through red, violet, brown, and slate.

The heat treatment of the parent glass bodies must be conducted under oxidizing conditions to effect the generation of a substantial integral surface layer of high crystallinity wherein the crystallinity consists essentially of hematite. When the crystallization in situ of the glass is carried out in a neutral or reducing atmosphere, the surface thereof is glassy with very little, if any, crystallization being developed. The formation of hematite crystallization is vital for the subsequent production of metallic iron surfaces which are founded in the reduction of the hematite crystals, as will be demonstrated hereinafter.

Table III also records the reducing environments to which the glass-ceramic bodies were exposed. Various gaseous atmospheres are operable for this purpose including hydrogen and mixtures of hydrogen and nitrogen. However, the essential absence of moisture is demanded to insure the development of an integral surface layer containing alpha-iron instead of magnetite. Therefore, the chamber in which the glass-ceramic article is subjected to the reducing treatment will preferably be purged of the ambient moisture present therein before the reducing treatment is begun.

In the following examples, dry forming gas (92% by volume nitrogen and 8% by volume hydrogen) comprised the reducing gaseous atmosphere employed. This gas is especially useful because it does not present the safety hazards of hydrogen and is relatively inexpensive. After baking at elevated temperatures and purging a heated furnace-tube with the gas to insure the removal of moisture therefrom, the samples were exposed to a flow rate of the gas of about 100 cc/minute.

Treatment in the reducing atmosphere caused the article surfaces to take on a dark appearance, commonly a dark gray hue. Reflection electron diffraction and X-ray diffraction analyses of the resultant surface layers identified the presence of alpha-iron. X-ray diffraction analysis could not be relied upon in some instances where the surface layer was extremely thin. The alpha-iron crystals appeared to be present in amounts in excess of 50% by volume.

As can be observed from Table III, most of the crystallization and reducing environment treatments were conducted on as-formed cane or pieces cut from the poured slabs, although polished pieces were used in certain instances. Surface electrical resistivity measurements were obtained by applying two contact electrodes of air dried silver. Measurements were taken with a Simpson Model 260 Volt-Ohm-Milliammeter which can measure resistivities from about $0.1-2 \times 10^7$ ohms.

Table III provides an indication of the range of surface electrical resistivities that are obtainable as a function of base composition, sample configuration, crystallization heat treatment, and exposure to reducing atmospheres. Examples 14 and 15 are of particular interest since both exhibit the development of an integral surface layer containing alpha-iron after a top crystallization temperature of only 1050° C. The other exemplary compositions required crystallization temperatures of at least 1100° C. When Examples 8 and 9 were treated at a temperature of 900° C., beta-quartz solid solution was formed, and subsequent exposure to dry forming gas atmospheres did not produce electrically conductive surface layers containing alpha-iron. Exposure of those articles to wet forming gas did, however, result in a surface layer containing magnetite.

As can be seen from heat treatment schedules in Table II, the precursor glass articles were normally heated to temperatures within the range of about 750°–850° C. prior to firing at temperatures above 1000° C. This constitutes the preferred practice of the invention since this lower temperature heating promotes the development of nuclei upon which the beta-spodumene solid solution or nepheline crystals grow at the higher temperature. This nucleation step, normally about 1–6 hours, leads to more uniformly-sized crystals and inhibits deformation of the glass as it is raised above the softening point thereof. Customarily, the crystallization step at higher temperatures is conducted for about 1–8 hours. However, longer periods may be employed to more fully develop the hematite surface layer.

Exposure to the reducing atmosphere will commonly be undertaken for about 2–8 hours. Longer periods do not adversely affect the electrical or magnetic properties of the final product, but neither do they show any significant advantage. Commonly, the cooling to room temperature will be undertaken in the presence of the dry reducing environment.

compositions. Thus, several of the examples demonstrated resistivities in excess of 10,000 ohms/square. Such examples included No. 10, containing more than the preferred amount of $P_2O_5$; No. 14, containing a combination of $P_2O_5$ and $B_2O_3$, No. 16, containing $B_2O_3$ alone; and the two nepheline compositions Nos. 22 and 23. In general, where a 1000A thick film has a surface resistivity of $10^6$ ohms/square, it will demonstrate a volume resistivity of about 10 ohm-cm. Such values are useful in resistor manufacture but are, of course, far below that of dielectric materials which can exhibit volume resistivities of $10^6$–$10^{12}$ ohm-cm.

Example 20 shows that prolonged heat treatments at a given temperature can hazard degradation of hematite development and resultant surface conductivity. In this case a spinel phase, $MgO.Al_2O_3$ and/or $ZnO.Al_2O_3$, gradually supersedes hematite as the predominant surface crystal phase. The presence of this spinel phase, or of a possible glassy phase associated therewith, may sequester the hematite surface crystals from exposure to the reducing atmosphere.

That the surface resistivity of some of the compositions can be markedly improved by the subjection thereof to an acid etch treatment prior to the firing in a reducing atmosphere can be readily seen from an inspection of Table IV. It appears that the simple $Li_2O$—$FeO$—$Al_2O_3$—$TiO_2$ compositions, such as Examples 5 and 7, are not appreciably affected thereby, nor is Example 9 containing $P_2O_5$. Furthermore, Example 10, containing excess $P_2O_5$ and the nepheline compositions, Examples 22 and 23, are incompatible with said etching as is evidenced by the surfaces spalling off during the

TABLE III

| Example No. | Heat Treatment | Sample Form | Appearance | Gas Firing | Surface Resistivity Ohms/Square |
|---|---|---|---|---|---|
| 1 | Schedule E | Cane | Dull orange-brown | 575° C.-3 hrs. | 8800 |
| 2 | Schedule A | Cane | Earthen red-brown | 650° C.-3 hrs. | 16.3 |
| 2 | Schedule A | Cane | Earthen red-brown | 600° C.-6 hrs. | 4.7 |
| 2 | Schedule E | Cane | Dull orange-brown | 575° C.-3 hrs. | 1044 |
| 3 | Schedule B | Cane | Earthen red-brown | 600° C.-3 hrs. | 469 |
| 3 | Schedule A | Cane | Earthen red-brown | 650° C.-3 hrs. | 46.7 |
| 3 | Schedule A | Cane | Earthen red-brown | 600° C.-5 hrs. | 12.5 |
| 4 | Schedule A | Cane | Earthen red-brown | 650° C.-3 hrs. | 136 |
| 5 | Schedule B | Slab | Earthen red-brown | 600° C.-6 hrs. | 3.5 |
| 6 | Schedule B | Slab | Dull red-violet | 800° C.-5 hrs. | 153 |
| 6 | Schedule D | Slab | Dull red-violet | 650° C.-3 hrs. | 169 |
| 6 | Schedule D | Slab | Dull red-violet | 600° C.-3 hrs. | 49.7 |
| 6 | Schedule D | Slab | Dull red-violet | 500° C.-6 hrs. | 32.5 |
| 6 | Schedule C | Polished bar | Dull red-violet | 600° C.-5 hrs. | 24.3 |
| 7 | Schedule B | Polished bar | Dull red-brown | 500° C.-6 hrs. | 56 |
| 8 | Schedule F | Cane | Dull red-violet | 600° C.-3 hrs. | 39.8 |
| 9 | Schedule F | Cane | Dull slate | 600° C.-3 hrs. | 1.0 |
| 10 | Schedule F | Cane | Glossy red-violet | 600° C.-3 hrs. | $4.7 \times 10^5$ |
| 11 | Schedule G | Slab | Dull slate-gray | 600° C.-5 hrs. | 3.4 |
| 12 | Schedule G | Slab | Dull violet-slate | 600° C.-5 hrs. | 70 |
| 13 | Schedule I | Slab | Flat gray | 600° C.-5 hrs. | 340 |
| 14 | Schedule J | Cane | Dull gray-violet | 600° C.-5 hrs. | $7.5 \times 10^4$ |
| 15 | Schedule J | Slab | Dull gray | 600° C.-5 hrs. | 2020 |
| 15 | Schedule M | Slab | Softened, deformed | — | — |
| 16 | Schedule H | Polished plate | Slate-gray | 500° C.-2 hrs. | $7.8 \times 10^5$ |
| 17 | Schedule N | Cane | Deep red-brown | 500° C.-3 hrs. | 47 |
| 18 | Schedule N | Cane | Slate | 500° C.-3 hrs. | 21 |
| 19 | Schedule K | Polished plate | Dull rust | 550° C.-5 hrs. | 188 |
| 20 | Schedule L | Polished plate | Violet-brown | 550° C.-3 hrs. | 588 |
| 20 | Schedule N | Polished plate | Violet-gray | 550° C.-3 hrs. | $1.8 \times 10^5$ |
| 20 | Schedule O | Polished plate | Flat gray | 575° C.-3 hrs. | Non-conductive |
| 21 | Schedule O | Slab | Dull gray-violet | 600° C.-5 hrs. | 28 |
| 22 | Schedule G | Polished plate | Dull red-violet | 600° C.-5 hrs. | $3.6 \times 10^5$ |
| 23 | Schedule H | Cane | Dull red-brown | 600° C.-5 hrs. | $4.1 \times 10^4$ |

As can be seen from Table III, a wide variety of surface resistivities can be produced in the inventive ment. It is assumed that the underlying glass-ceramic treat-substrate is attacked by the acid, thereby undermining the surface layer. However, Examples 14 and 15, containing a combination of $B_2O_3$ and $P_2O_5$ demonstrated markedly improved conductivity (lower resistivity) after acid etching. An etched sample of Example 20 is also included which, although crystallized in situ at a lower temperature than the samples reported in Table III, by its very low resistivity suggests that an acid etch may be useful with this MgO + ZnO-containing sample. It is believed that in all instances the etch removes an interfering surface phase, probably glassy, which inhibits reduction of the hematite to iron by the gaseous atmosphere. In Example 20 an interfering surface crystalline phase may be removed by the etch.

The etching practices recited in Table IV involved immersion of a sample for two minutes in boiling acid. Thereafter, the samples were exposed to dry forming gas for 5 hours at 600° C. The surface resistivity values are expressed in terms of ohms/square.

were magnetized and the magnetic properties were measured by the application of a strong magnetic field thereto. The strength of the applied magnetic field was increased until the test sample was magnetically saturated. The applied field was thereafter decreased to zero and the degree of permanent magnetization of the sample was measured in terms of the remanent magnetic flux, expressed in Maxwells/cm. The coercive force, expressed in Oersteds, required to demagnetize the sample was determined by applying an increase in magnetic field of reverse polarity.

The superior electrical conductivity of the iron-containing surface is clearly obvious from Table VI. The surfaces of both articles exhibit excellent and surprisingly similar magnetic properties. Unexpectedly, the alpha-iron surface layer does not behave in the manner of pure iron which has an almost zero coercive force, permitting it to be instantly magnetized or demagnetized as a magnetizing field is applied or removed. In-

TABLE IV

| Example No. | Heat Treatment | No Etch | $HNO_3$ Concentrated | $HNO_3$ 10 vol. % | HCl 10 vol. % | $H_2SO_4$ 10 vol. % | $H_3PO_4$ 10 vol. % |
|---|---|---|---|---|---|---|---|
| 5 | Schedule N | 1.5 | 1.6 | 2.0 | 2.1 | — | 1.9 |
| 7 | Schedule N | 21 | 61 | 69 | 63 | 76 | — |
| 9 | Schedule F | 3.5 | 2.9 | 3.6 | 3.5 | — | — |
| 10 | Schedule F | $4.7 \times 10^5$ | Attacked | — | — | — | — |
| 14 | Schedule J | $7.5 \times 10^5$ | 40 | 43 | 57 | — | — |
| 15 | Schedule J | 2020 | 205 | 137 | 113 | — | 197 |
| 20 | Schedule G | — | 40 | — | — | — | — |
| 22 | Schedule G | $3.6 \times 10^5$ | Attacked | — | Attacked | — | — |

Table V summarizes magnetic property data obtained for several of the compositions of Table I utilizing a firing treatment in dry forming gas. As can readily be seen, each article displays a high degree of remanent magnetization (expressed in Maxwells/cm) and the group exhibits a range of coercive force (expressed in Oersteds) which tends to be somewhat lower than values generally measured on magnetitecontaining surfaces. The duplicate runs of Example 5 illustrate reasonably good reproducibility of results.

TABLE V

| Example No. | Heat Treatment | Gas Firing | Maxwells/cm | Oersteds |
|---|---|---|---|---|
| 5 | Schedule M | 575° C. - 5 hours | 0.31 | 280 |
| 5 | Schedule M | 575° C. - 5 hours | 0.28 | 222 |
| 19 | Schedule K | 550° C. - 5 hours | 0.26 | 254 |
| 20 | Schedule L | 550° C. - 3 hours | 0.33 | 500 |

Table VI illustrates clearly the need for moisture to be absent in the reducing environment to insure the growth of alpha-iron rather than magnetite in the surface layer. Hence, Table VI points up the differences in final product properties obtained in using dry forming gas and wet forming gas. The basis of the table lies in the subsequent exposure of Example 6 of Table I to a reducing atmosphere after being subjected to the following crystallization schedule.

300° C./hour to 750° C.
20° C./hour to 850° C.
250° C./hour to 1200° C.
Hold thereat for 24 hours The extended heat treatment acts to develop a thick surface layer of high crystallinity containing hematite crystals.

The samples showed no electrical conductivity or magnetism after the crystallization step. The articles stead, it appears to exhibit the properties of a permanent magnet with a moderate coercive force. This behavior may be caused by the presence of impurities in the iron-containing surface layer, or, more likely, it may be a result of the manner in which the iron is prepared from a thin hematite surface layer.

That the magnetic and electrical properties exhibited by both kinds of glass-ceramic articles are strictly a surface effect can be demonstrated by destroying the surface layers. Hence, immersing the alpha-iron-containing article or the magnetite-containing article in a bath of boiling concentrated hydrochloric acid etched the surface away. Also, heating either article in air at 750° C. caused the iron or the magnetite to be reoxidized to hematite. In both instances, the new surfaces evidenced neither magnetism or electrical conductivity.

TABLE VI

|  | Alpha-Iron | Magnetite |
|---|---|---|
| Reduction Step | 575° C. - 3 hours Dry forming gas | 575° C. - 3 hours Wet forming gas |
| Appearance | Gray-black | Black |
| Surface | Alpha-Iron | Magnetite |
| X-ray diffraction | (very strong) | (very strong) |
| Surface resistivity (Ohms/Square) | 4 | $2.7 \times 10^5$ |
| Remanent magnetization (Maxwells/cm.) | 0.67 | 0.47 |
| Coercive Force (Oersteds) | 204 | 280 |

The electrical conductivity of the iron-containing surface layer is affected by an increase in temperature in a different manner from that of the magnetite-containing surface layer. Thus, the iron-containing surface demonstrates a negative coefficient of conductivity with temperature, i.e., the resistivity increases with an increase in temperature. In contrast, the magnetite-containing surface exhibits a positive coefficient of conductivity with temperature.

The photograph appended to this application is a replica electron micrograph of the surface layer of Example 19 treated in accordance with the parameters set out in Table III. (This white bar at the base of the photograph represents a distance of 1 micron). Metallic iron is seen therein as an array of thin, anhedral, plate-like crystallites about 3-5 microns in diameter. It is believed that this morphology may account for the relatively high coercive forces exhibited by the iron films when compared with that of bulk iron, which is generally less than one oersted.

Low temperature crystallization heat treatments, followed by firing in dry forming gas, were conducted on several of the compositions of Table I to determine whether metallic iron films could be developed on the resulting glass substrate or glass-ceramic substrate where metastable beta-quartz solid solution (s.s.) crystals constituted the predominant phase. As can be seen from Table VII, the surfaces produced were non-conducting. The effect of the forming gas treatment was to reduce the thickness of the original hematite surface layer, often to the point that it was completely eliminated. It is believed that under such conditions the ferrous ions produced by the reduction reaction of the forming gas are able to diffuse back into the substrate. Reheating those materials to about 750° C. in air will cause redevelopment of a hematite surface phase. Restoration of a ground and polished or etched-off hematite surface layer can normally be secured on such articles only when additional surface, e.g., to a depth of about 1 mm., has been removed and the article is heated to about 800°-900° C. for at least about one hour.

The crystallization heat treatment schedules applied to the articles of Table VII are set out below:

| | |
|---|---|
| Schedule 1: | Heat at 300° C./hour to 800° C. |
| | Hold thereat for 4 hours |
| | Heat at 200° C./hour to 900° C. |
| | Hold thereat for 4 hours |
| Schedule 2: | Heat at 300° C./hour to 800° C. |
| | Hold thereat for 4 hours |
| | Heat at 200° C./hour to 900° C. |
| | Hold thereat for 12 hours |

The acid etch referred to in Table VII comprised a twominute immersion in boiling concentrated nitric acid.

essentially of alpha-iron crystals dispersed within a glassy matrix and being present in amounts in excess of 50% by volume, consisting of the steps of:

(a) melting a batch for a glass having an overall composition selected from the group:
  (A) a glass consisting essentially, in weight percent on the oxide basis of about 3-6% $Li_2O$, 1-5% FeO, 15-25% $Al_2O_3$, 50-75% $SiO_2$, and 2-7% $RO_2$, wherein $RO_2$ consists of 2-6% $TiO_2$ and 0-3% $ZrO_2$; and
  (B) a glass approximating the stoichiometry of nepheline consisting essentially, in weight percent on the oxide basis, of about 10-20% $Na_2O$, 1-5% FeO, 30-37% $Al_2O_3$, 36-42% $SiO_2$, 0-10% $K_2O$, and 2-7% $RO_2$, wherein $RO_2$ consists of 2-6% $TiO_2$ and 0-3% $ZrO_2$;

(b) simultaneously cooling the melt to a temperature at least within the transformation range thereof and forming a glass article therefrom;

(c) exposing said glass article in an oxidizing atmosphere to a temperature of at least about 1000°, but not in excess of about 1300° C., for a period of time sufficient to cause the growth of crystals selected from the group consisting of beta-spodumene solid solution and nepheline in situ in the body portion of said article and the growth of hematite crystals in situ in an integral surface layer on said article thereby producing a glass-ceramic article; and thereafter (d) subjecting said glass-ceramic article to an essentially dry, gaseous reducing atmosphere at a temperature between about 500°-800° C. for a period of time sufficient to reduce the hematite crystals in said surface layer to alpha-iron crystals to product an electrically conductive surface layer.

2. A method according to claim 1 wherein said glass article is first exposed to a temperature between about 750°-850° C. for about 1-6 hours and then exposed to a temperature of at least about 1000°, but not in excess of about 1300° C., for about 1-8 hours to produce a glass-ceramic article.

3. A method according to claim 1 wherein said glass-ceramic article is exposed to an essentially dry, gaseous reducing atmosphere at a temperature between about 500°-800° C. for about 2-8 hours.

4. A method according to claim 1 wherein said gase-

TABLE VII

| Example No. | Heat Treatment | Appearance | Crystal Phase | Acid Etch | Gas Firing | Appearance | Conductivity |
|---|---|---|---|---|---|---|---|
| 5 | Schedule 2 | Gun metal | Beta-quartz s.s. | Yes | 500° C.-3 hours | Dull gray | None |
| 5 | Schedule 2 | Gun metal | Beta-quartz s.s. | No | 500° C.-3 hours | Dull gray | None |
| 6 | Schedule 1 | Silver mirror | Beta-quartz s.s. | No | 650° C.-3 hours | Glossy black | None |
| 7 | Schedule 1 | Satiny silver | Beta-quartz s.s. | No | 650° C.-3 hours | Glossy black | None |
| 9 | Schedule 2 | Metallic violet | Beta-quartz s.s. | No | 500° C.-3 hours | Dull violet | None |
| 9 | Schedule 2 | Metallic violet | Beta-quartz s.s. | Yes | 500° C.-3 hours | Dull violet | None |

We claim:

1. A method for making a glass-ceramic article composed of a body portion and an integral surface layer demonstrating electrically conductive properties, said body portion consisting essentially of crystals dispersed within a glassy matrix, said crystals being present in amounts in excess of 50% by volume and being selected from the group consisting of beta-spodumene solid solution and nepheline, and said surface layer consisting ous reducing atmosphere consists of dry forming gas (92% $N_2$-8% $H_2$).

5. A method according to claim 1 wherein said surface layer is no more than several thousand angstroms thick.

6. Glass ceramic article made in accordance with the method of claim 1.

* * * * *

UNITED STATES PATENT OFFICE
CERTIFICATE OF CORRECTION

PATENT NO. : 4,084,972
DATED : April 18, 1978
INVENTOR(S) : Ronald L. Andrus and Richard F. Reade It is certified that error appears in the above-identified patent and that said Letters Patent are hereby corrected as shown below:

Column 7, line 19, "temperature" should be -- temperatures --.

Column 8, line 68, "ment." should be -- treatment. --.

Column 9, line 1, "treat-substrate" should be -- substrate --.

Column 9, line 14, after "may" insert -- also --.

Column 9, line 38, "magnetitecontaining" should be -- magnetite-containing --.

Column 11, line 44, "twominute" should be -- two-minute --.

Signed and Sealed this

Twenty-seventh Day of February 1979

[SEAL]

Attest:

RUTH C. MASON
Attesting Officer

DONALD W. BANNER
Commissioner of Patents and Trademarks